No. 896,828. PATENTED AUG. 25, 1908.
A. B. HERRICK.
SELECTIVE MECHANISM FOR TESTING DEVICES.
APPLICATION FILED NOV. 25, 1904.
2 SHEETS—SHEET 1.
Fig. 1.
Fig. 2.
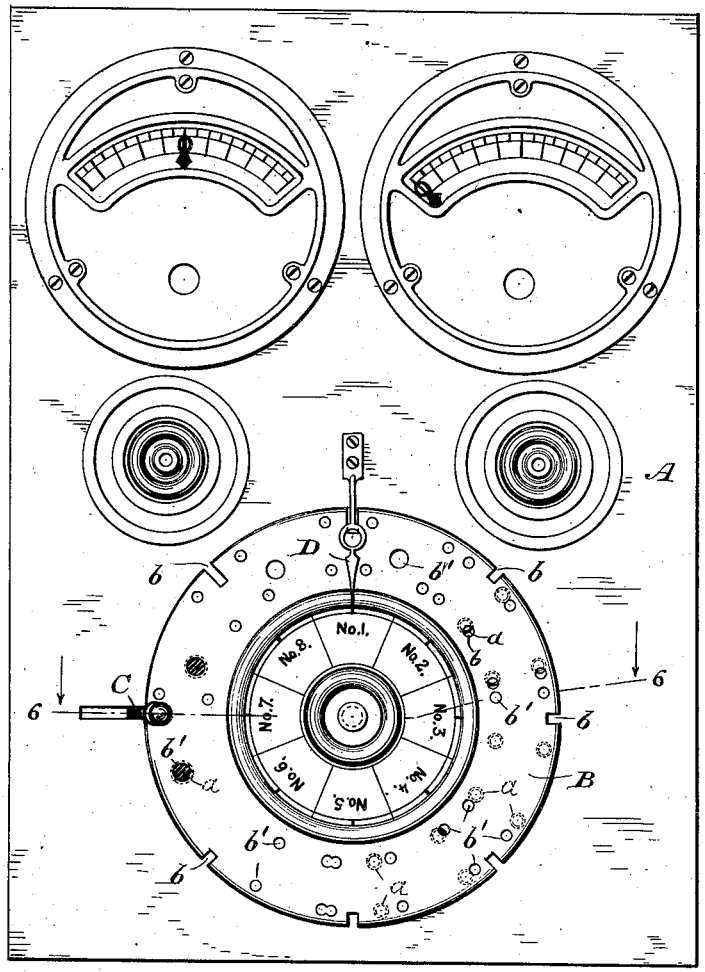
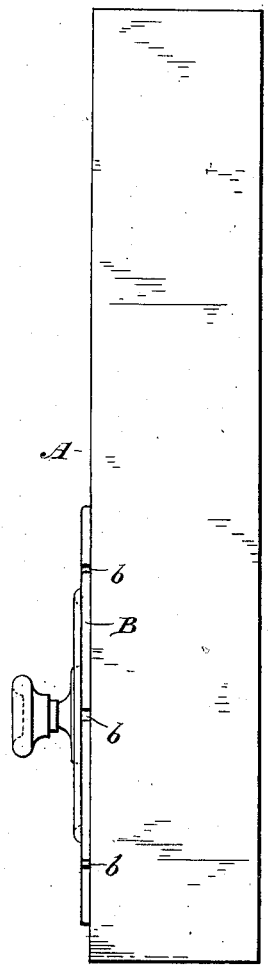
WITNESSES:
A. E. Merkel
E. M. Norling.
INVENTOR:
Albert B. Herrick,
by his attorney
J. B. Fay.

No. 896,828. PATENTED AUG. 25, 1908.
A. B. HERRICK.
SELECTIVE MECHANISM FOR TESTING DEVICES.
APPLICATION FILED NOV. 25, 1904.
2 SHEETS—SHEET 2.
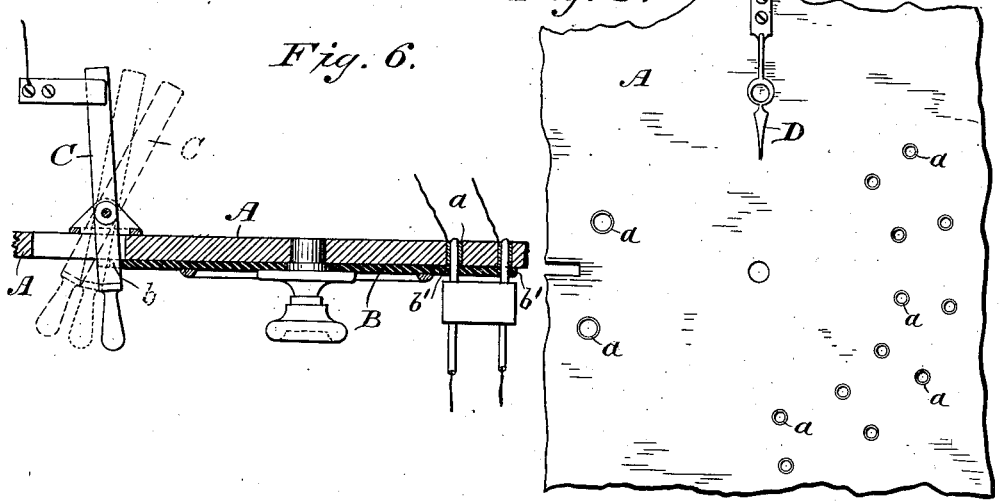
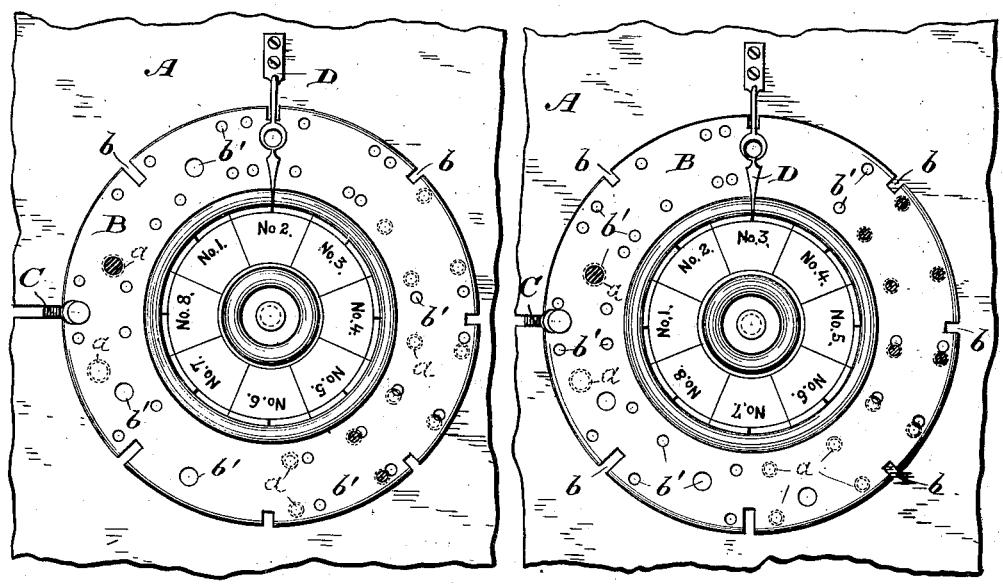
WITNESSES:
A. E. Merkel
E. M. Norling
INVENTOR:
Albert B. Herrick,
by his attorney
J. B. Fay.

UNITED STATES PATENT OFFICE.

ALBERT B. HERRICK, OF CLEVELAND, OHIO.

SELECTIVE MECHANISM FOR TESTING DEVICES.

No. 896,828.   Specification of Letters Patent.   Patented Aug. 25, 1908.

Application filed November 25, 1904.   Serial No. 234,163.

*To all whom it may concern:*

Be it known that I, ALBERT B. HERRICK, a citizen of the United States, resident of Cleveland, county of Cuyahoga, and State of Ohio, have invented a new and useful Improvement in Selective Mechanism for Testing Devices, of which the following is a specification, the principle of the invention being herein explained and the best mode in which I have contemplated applying that principle, so as to distinguish it from other inventions.

My invention relates to mechanism for electrical testing devices in which a number of different combinations of electrical connections may be made for the purpose of conducting different kinds of tests.

The object of said invention is to provide means whereby the formation of improper connections may be prevented and thus provide protection against injury to the measuring devices such as ammeters, voltmeters etc., used in such tests.

The said invention consists of means hereinafter fully described and particularly set forth in the claims.

The annexed drawings and the following description set forth in detail certain means embodying the invention, such disclosed means constituting but one of various mechanical forms in which the principle of the invention may be used.

In said annexed drawings:—Figure 1 represents a front view of a testing device embodying my invention and Fig. 2 represents a side elevation thereof. Fig. 3 represents a front view of a selective testing device the same as is shown in Fig. 1 but with its mechanism arranged for a different test. Fig. 4 represents the said mechanism in a third position. Fig. 5 represents a portion of the front face of the frame of the testing device, shown on an enlarged scale. Fig. 6 represents the detail section of a device taken upon the plane indicated by line 6—6, Fig. 1.
My invention is employed in connection with a combination of measuring instruments, resistances and connections, all arranged so as to be adapted for making various electrical tests used by electrical engineers for examining the conditions of electrical apparatuses. This arrangement is well known to those skilled in the art and need not herein be described in detail.

My invention, as before mentioned is confined to means whereby the connections for various tests may be properly made and in such a manner as to be what is ordinarily designated "fool-proof".

The front A of the frame of the testing device is provided with a series of perforations in which are located, upon arcs of concentric circles, the terminal sleeves *a, a*, as shown in Figs. 5 and 6 in full and in Figs. 3 and 4 in dotted lines, these sleeves being adapted to receive ordinary plugs for making connections therewith. Rotatably mounted upon the frame and having its axis passing through the center of the circles upon the circumference of which lie the centers of the sleeves *a, a*, is a manually rotatable disk B preferably made of hard rubber or similar insulating material. The outer edge of this disk is intersected by a series of incisions *b* to the number of eight in the particular apparatus illustrated, such apparatus being designed to provide for eight different tests. Included in the connections is a knife-switch C which closes a circuit for three of the particular tests. This switch projects through the face of the frame, as shown in Fig. 6 and is adapted to engage the incisions *b* in the disk. As illustrated, these incisions are of different depths, those of greater depth allowing the switch to close the circuit and at the same time lock the disk in place, as shown in said figure. The remaining incisions are made of such a depth as to permit the knife-switch to lock the disk but not to close the circuit. It will thus be seen, that in any case the switch may be caused to lock the disk in any one of its eight different positions and in three of such positions to also close a given circuit, as may be required in order to carry out the corresponding tests. It will be understood that apparatus designed for various sets of tests may have their disks provided with said incisions in accordance with the various requirements, insofar as concerns the depth of said incisions. Perforating said disk is a series of apertures *b'* which are arranged upon arcs of circles having their centers lying in the axis of the disk. These apertures are so arranged that they will register with the sleeves *a, a* in various combinations, as shown in Figs. 1, 3, and 4, when the disk is locked in its various positions by the knife switch C. In said figures the registering apertures and sleeves are indicated by the sectioned circles. It will therefore be seen that only the registering sleeves may receive the connecting plugs, as shown in Fig. 6, to the exclusion of all of the remaining sleeves. The arrangement of the apertures is such as to cause only the proper sleeves to come into registration therewith when the disk is locked in any one of its eight positions, thus preventing the formation of improper connections. For convenience, I have provided upon the central portion of the disk, means for identifying the eight positions of the disk, so that in connection with the indicating pointer D, secured to the face of the frame, the particular test may be indicated. For instance, assuming that it is desired to carry out test number 4, the character of which is known to the engineer, the disk is turned by hand so as to bring the pointer to the position opposite the name and number of the test indicated upon the central portion, and so as to bring the corresponding incision *b* opposite the knife-switch. The latter is then thrown over so as to lock the disk in place. The proper sleeves are now in position to be connected with the plugs so as to complete the required circuit for making such test.

Other means of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In mechanism for electrical testing devices, the combination with a plurality of sets of fixed terminals, and other movable terminals adapted to be connected therewith, of a member having a plurality of sets of apertures corresponding to the sets of fixed terminals, and movable to a different and definite position for each set of fixed terminals to permit connection of the movable terminals, and a circuit switch controlled by the position of said movable member whereby it can only be closed when the movable member is at one of the said definite positions.

2. In mechanism for electrical testing devices, the combination with a plurality of sets of fixed terminals, and the other movable terminals adapted to be connected therewith, of a rotary member having a plurality of sets of apertures corresponding to the sets of fixed terminals, and movable to a different and definite position for each set of fixed terminals to permit connection of the movable terminals.

3. In mechanism for electrical testing devices, the combination with a support, of a plurality of fixed terminals mounted thereon, and a disk rotatably mounted in front of said terminals and provided with a plurality of apertures adapted in different positions of said disk to aline with different sets of said terminals and to simultaneously exclude all the remaining terminals from such alinement.

4. In mechanism for electrical testing devices, the combination with a support, of a plurality of fixed terminals mounted thereon, a circular disk rotatably mounted in front of said terminals and provided with a plurality of apertures adapted in different positions of said disk to aline with different sets of said terminals and to simultaneously exclude all of the remaining terminals from such alinement, said disk being provided about its periphery with a series of notches, and a member adapted to engage said notches to hold said disk against rotation.

5. In mechanism for electrical testing devices, the combination with a support, of a plurality of fixed terminals mounted thereon, a circular disk rotatably mounted in front of said terminals and provided with a plurality of apertures adapted in different positions of said disk to aline with different sets of said terminals and to simultaneously exclude all of the remaining terminals from such alinement, said disk being provided about its periphery with a series of notches of different depths, and a switch-actuating member adapted to engage said notches to hold said disk against rotation, the actuation of such switch being controlled by the depth of the particular notch engaged by said member.

6. In an electrical testing apparatus, the combination with sets of circuit terminals, of a movable selective device controlling according to its position the respective sets of terminals, any one of which may be used singly, of means for locking said selective device, said locking means at certain positions also controlling circuits in connection with the terminals used at the corresponding positions, substantially as described.

7. In an electrical testing apparatus, having means for making a plurality of tests, the combination with sets of circuit terminals for the respective tests, and a circuit switch, of selective means independent of the switch and controlling its closing to permit a test using said switch to be made only when said switch can be closed, substantially as described.

8. In mechanism for electrical testing devices, the combination with a plurality of sets of fixed terminals, and the other terminals adapted to be connected therewith, of a rotary member having a plurality of sets of apertures corresponding to the sets of fixed terminals, and movable to a different and definite position for each set of fixed terminals to permit connection of the movable terminals, and a circuit switch controlled by the position of said movable member whereby it can only be closed when the movable member is at one of the said definite positions.

9. In mechanism for electrical testing devices, the combination with a plurality of fixed terminals, and other movable terminals adapted to be connected therewith, of a member having a plurality of sets of apertures corresponding to the sets of fixed terminals, and movable to a different and definite position for each set of fixed terminals to permit connection of the movable terminals, and a circuit switch controlled by the position of said movable member whereby it can only be closed when the movable member is at one of the said definite positions, said switch when closed locking the movable device in position.

Signed by me, this 21st day of November 1904.

ALBERT B. HERRICK.

Attested by—
E. M. NORLING,
A. E. MERKEL.